United States Patent
Griffin et al.

(10) Patent No.: US 9,341,410 B1
(45) Date of Patent: May 17, 2016

(54) APPARATUS FOR REMOVING LIQUID FROM A SUSPENSION

(71) Applicant: Gryphon Environmental, LLC, Hartford, KY (US)

(72) Inventors: William Tid Smith Griffin, Hartford, KY (US); Joshua Michael-James DeArmond, Greenville, KY (US)

(73) Assignee: Gryphon Environmental, LLC, Owensboro, KY (US)

( * ) Notice: Subject to any disclaimer, the term of this patent is extended or adjusted under 35 U.S.C. 154(b) by 129 days.

(21) Appl. No.: 14/250,627

(22) Filed: Apr. 11, 2014

Related U.S. Application Data

(60) Provisional application No. 61/810,850, filed on Apr. 11, 2013.

(51) Int. Cl.
    *F26B 17/08*      (2006.01)
    *F26B 17/00*      (2006.01)

(52) U.S. Cl.
    CPC ..................... *F26B 17/00* (2013.01)

(58) Field of Classification Search
    CPC .......... F26B 17/00; F26B 17/06; F26B 17/08; F26B 19/00; F26B 21/06; B01D 1/00; B01D 1/28; B01D 1/18; C02F 1/12; C02F 11/12
    USPC ............. 34/78, 79, 80; 118/58; 134/153, 157; 210/48.01, 175, 748.01
See application file for complete search history.

(56) References Cited

U.S. PATENT DOCUMENTS

| | | | | |
|---|---|---|---|---|
| 3,673,822 A | * | 7/1972 | Fleissner | D06B 3/16 68/19.1 |
| 3,685,167 A | * | 8/1972 | Loveday | D21F 5/00 34/635 |

(Continued)

FOREIGN PATENT DOCUMENTS

| | | | | |
|---|---|---|---|---|
| CA | 2435384 A1 | * | 7/2002 | B01D 29/01 |
| WO | WO 2010039250 A1 | * | 4/2010 | B01D 1/14 |

OTHER PUBLICATIONS

ANDRITZ AG, "Belt Dryer BDS for drying of biomass," ANDRITZ Separation product information available at http://atl.g.andritz.com/c/com2011/00/02/37/23718/1/1/0/-1067311783/se-downloads-beltdryer-biomass.pdf., on Jul. 9, 2014.

(Continued)

*Primary Examiner* — Stephen M Gravini
(74) *Attorney, Agent, or Firm* — Stites & Harbison, PLLC; David W. Nagle, Jr.

(57) ABSTRACT

An apparatus for removing liquid from a suspension comprises: one or more drying chambers; a conveyor system for transporting the suspension through the drying chambers at a substantially continuous speed, including a semi-permeable conveyor belt; a blower for injecting air into the drying chambers; a vacuum pipe and one or more vacuum pipe segments that extend from the vacuum pipe into each of the drying chambers for drawing saturated air out of each of the drying chambers, and wherein the vacuum pipe is operably connected to an intake of the blower. The apparatus may further comprise a condenser receiving the saturated air from the vacuum pipe, cooling the saturated air, and collecting liquid from the saturated air before returning it to the blower. The apparatus may further comprise a preheating arrangement in which cooled air exiting the condenser is passed through the drying chambers before returning it to the blower.

17 Claims, 10 Drawing Sheets

(56) References Cited

U.S. PATENT DOCUMENTS

| | | | | |
|---|---|---|---|---|
| 4,599,809 | A * | 7/1986 | Parkes | F26B 25/22 34/484 |
| 4,888,884 | A * | 12/1989 | Bartling | B01D 46/36 34/479 |
| 5,557,859 | A * | 9/1996 | Baron | F26B 3/286 34/102 |
| 5,632,097 | A * | 5/1997 | Snitchler | F26B 17/006 34/166 |
| 5,724,751 | A * | 3/1998 | Ellingsen | B01D 1/18 34/147 |
| 6,105,273 | A * | 8/2000 | Johanson | B01J 8/08 34/267 |
| 6,233,841 | B1 * | 5/2001 | Beach | A23L 3/54 34/203 |
| 6,715,662 | B2 * | 4/2004 | Rogers | B23K 3/04 110/204 |
| 7,694,432 | B2 * | 4/2010 | Eriksson | F26B 3/283 110/245 |
| 7,749,395 | B2 | 7/2010 | Griffin et al. | |
| 8,673,156 | B2 | 3/2014 | Griffin et al. | |
| 8,726,533 | B2 * | 5/2014 | Cai | F26B 15/18 110/233 |
| 8,806,771 | B2 * | 8/2014 | Holmes | B29B 13/065 219/388 |
| 2002/0113014 | A1 * | 8/2002 | Stroup | B01D 29/01 210/637 |
| 2010/0112225 | A1 * | 5/2010 | Sato | B05D 3/105 427/335 |
| 2014/0161680 | A1 * | 6/2014 | Kantor | B01J 19/126 422/186.03 |
| 2014/0263769 | A1 * | 9/2014 | Lakhmiri | B02C 21/00 241/24.11 |
| 2015/0176896 | A1 * | 6/2015 | Kuhnau | F26B 5/041 34/406 |

OTHER PUBLICATIONS

ANDRITZ AG, "ANDRITZ Belt-drying system BDS," product information downloaded at http://www.andritz.com/products-and-services/pf-detail.htm?productid=5152 on Jul. 9, 2014.

* cited by examiner

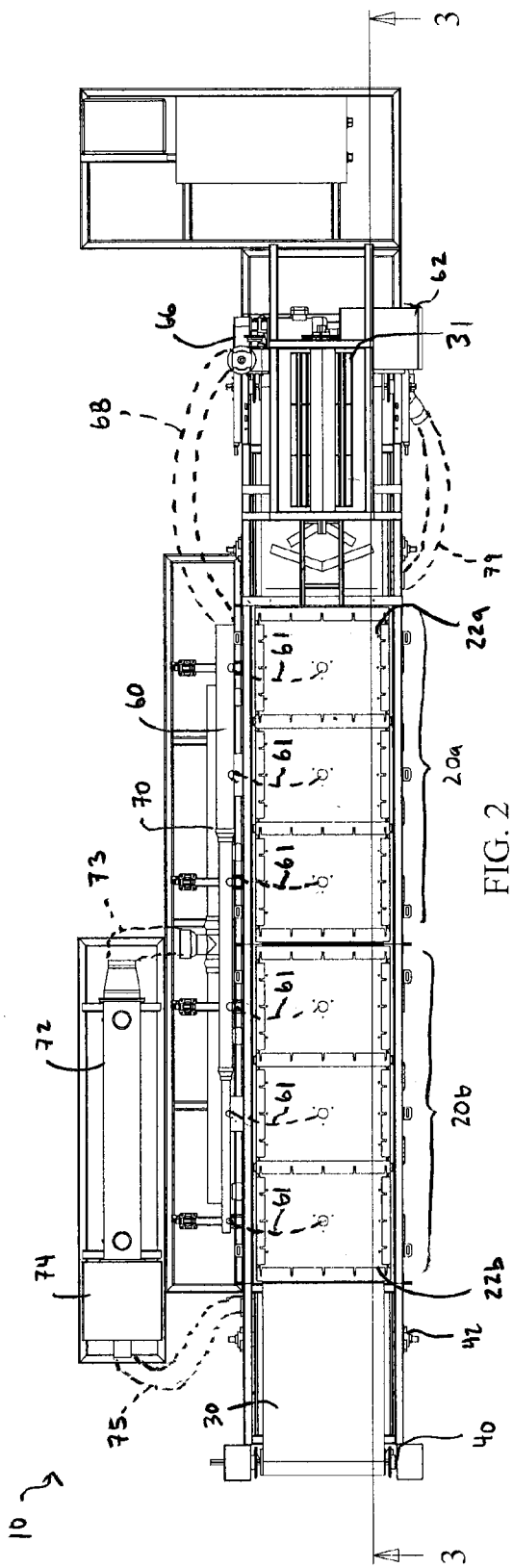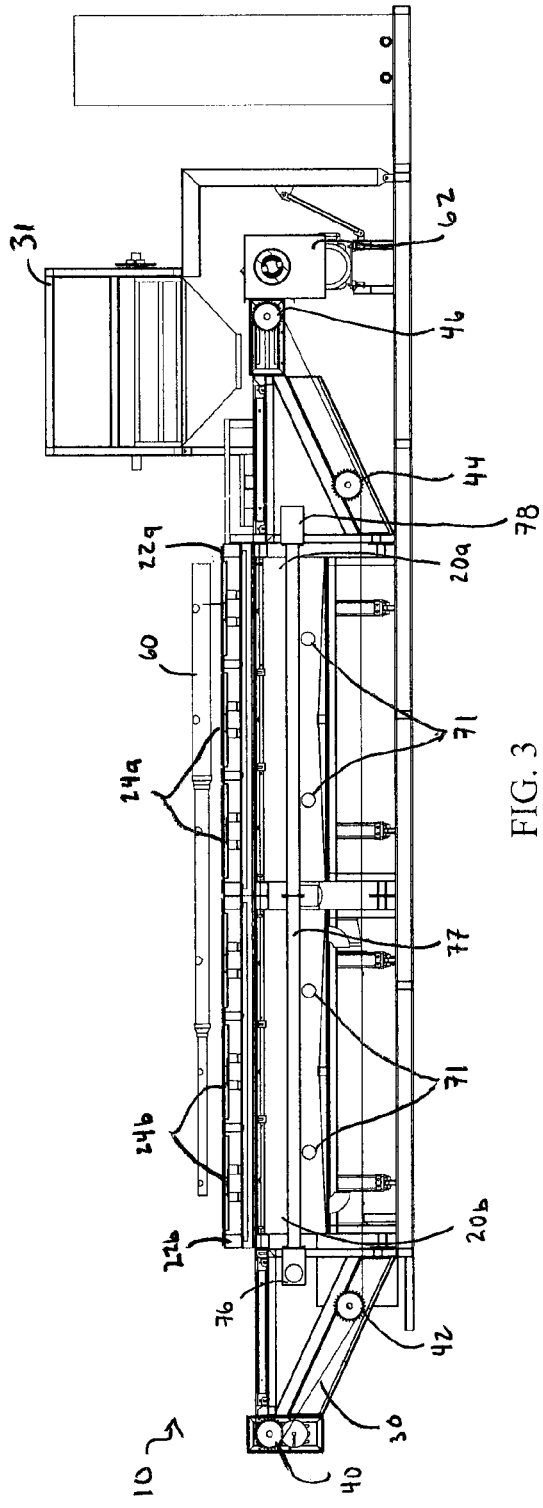

APPARATUS FOR REMOVING LIQUID FROM A SUSPENSION

CROSS-REFERENCE TO RELATED APPLICATIONS

The present application claims priority to U.S. Provisional Patent Application Ser. No. 61/810,850 filed on Apr. 11, 2013, the entire disclosure of which is incorporated herein by reference.

BACKGROUND OF THE INVENTION

The present invention relates to an apparatus for removing liquid from a suspension.

Mixtures of liquids and solids, known as suspensions, present expensive disposal problems to the industries that generate them. Unprocessed suspensions typically cannot be disposed of in landfills due to regulations on water content. Even with more permissive regulations, it is much more expensive to transport and dispose of unprocessed suspensions as compared to solid components because transportation charges and landfill charges correspond to weight.

Additionally, the scope of potential uses of such suspensions is often substantially increased by removal of the liquid component from the solid component. Typically, the value of the dry solids arises from the decrease in weight occasioned by the removal of the liquid fraction, which leads to decreased disposal and transportation costs. The recovered dried solids may also be commercially valuable, such as if they are useable in other industrial and municipal applications (e.g., renewable fuel) or can be sold in secondary markets, such as in the case where the suspensions comprise paper, fiber, coal or mineral slurries.

Unfortunately, efforts to work around the suspension disposal problems often employ methods lacking environmental soundness. For example, many industries dump suspensions, such as waste products, into holding ponds, which are typically large concrete or plastic lined, man-made pools requiring acres of real estate. The suspensions then sit in these holding ponds while the solid materials settle at the bottom over time with the aid of only gravity. Aside from being a slow process, the potential for the pool lining to fail or result in contamination of the surrounding environment makes this a less-than-desirable solution in terms of both efficiency and environmental impact.

Industrial suspension ponds suffer from significant practical difficulties. For instance, holding ponds have a poor resulting yield (dry solid percentage content). Being passive, it also takes a long time to separate water from solids for a given volume of suspension, as compared to devices that rely on active separation. Keeping up with the output for any given suspension flow rate requires a greater area than if active separation systems are used. Two active separation systems, centrifuge processors and belt presses, each produce higher solid content yields than suspension ponds; however, they lack the ability to utilize thermodynamics to achieve 60-100% dry solid percentage yields. These active separation systems are also expensive to purchase and operate, and they are not readily scaled up or down to handle corresponding volumes of industrial suspension flow rates. The lack of portability and limitations on the amount of material which can be processed in a given time are also a significant limiting factor.

Certain drying technologies have been used to further remove water from suspensions processed by belt presses or screw presses. These drying technologies have focused on the use of thermal energy for removing water from the suspensions. For instance, drum dryers have been used; however, the technology is expensive in terms of both capital and operating costs. Belt dryers have also been used and promoted as way of reducing footprint and costs. However, like drum dryers, belt dryers relay primarily on thermal energy to remove the water from a suspension by use of heat. Using heat to remove water requires large amounts of thermal energy to be available, which significantly adds to the operating costs of drying. In addition, both belt and drum dryers lack the ability of flexible throughputs, and also require large systems and high temperatures to operate.

In an attempt to address such limitations and disadvantages in the prior art, in commonly assigned U.S. Pat. No. 8,673,156, which is incorporated herein by reference, a suspension liquid extraction apparatus and method is described. The apparatus is particularly suited for separating water or other liquids from solids in all types of suspensions, including effluents (mixed water and waste) or slurries. In this regard, in the context of U.S. Pat. No. 8,673,156 and in the present application, mixtures of solids and liquids may be referred to as a "suspension." Such a suspension includes any combination of particulate matter (solids) suspended in or containing significant quantities of water or any other liquid. While it is envisioned that the primary use of the apparatus is to dewater effluents, it is anticipated that the apparatus will be equally useful in any application that requires removal of liquids from any mixture of liquids and solids.

Referring still to U.S. Pat. No. 8,673,156, the apparatus includes at least one arced container for receiving and at least temporarily holding the suspension, which may flow from a suspension discharge pipe or other source onto a conveyor belt which carries a filter. The container may comprise a chamber or compartment bounded by an interior curved sidewall having plurality of graduated, arcuate conduits. A cover (or lid), such as a substantially airtight, preferably non-permeable pliable membrane, may be placed over the container to form an airtight seal within the container. The container may be further divided into a series of chambers using an apparatus that locks into place once the conveyor belt has moved the suspension into the chamber. The apparatus seals around the conveyor belt to create separate chambers within the container.

Each of the chambers is separated by a container seal constructed from a non-permeable substrate to create a dividing wall seal. The suspension will be transferred directly from one chamber to the next while certain liquid removal processes are performed upon the suspension. Preferably, the suspension will be temporarily stored in each chamber for approximately six minutes while the dewatering process is performed. The suspension is moved from the first chamber to the second and subsequently the third chamber using the conveyor belt. The conveyor belt is supported from below to prevent the conveyor belt from significantly contorting during the drying process. Vacuum conditions reaching 23 inches of mercury (77.9 kPa) pressure within a single 6-foot (1.83 m) by 12-foot (3.66 m) chamber can produce over 114,000 lbs (51.2 metric tons) of force from the pliable membrane onto the conveyor belt.

A vacuum is applied to the first chamber within the container through the conduits, and the negative pressure causes the liquid component of the suspension to be forced through the filter and the conduits for recovery. The negative pressure created by the vacuum acts upon the pliable membrane and pulls the membrane towards the vacuum, which, in turn, applies positive pressure on the suspension from above, forcing the liquids of the suspension through a filter. To draw liquid from the suspension in the container, a pressure differential is created across the pliable membrane in each of the chambers to create a squeezing force as the membrane is pulled towards the vacuum.

The graduated design of the sidewall and conduits enable even flow rates. This also results in a substantially equal vacuum pressure being applied to the entire surface area of the filter below the suspension and to the pliable membrane above the suspension and enables captured (filtered) solids in the suspension to be evenly dispersed across the filter media. The pliable membrane acts to absorb the bulk of all vacuum pressure. By doing so, the entire force, over time, of the vacuum is applied to the suspension during the drying process by the pliable membrane. This force creates a negative pressure or vacuum chamber in which water evaporates at lower temperatures. With the additional application of external heat to the chamber, the apparatus can further reduce the water content of the suspension efficiently.

The liquid removal process may occur over multiple chambers to achieve the desired level of dryness for the solid component of the suspension in the container. Additionally, heat may be employed to speed the separation process, and the suspension may also be mixed or agitated for this reason. Heated compressed air injection, radiant heat, pressure, microwaves, and vacuum can be employed to remove the liquid component from the solid component of the suspension in a rapid fashion. Sensors and automatic release valves may be used to ensure that the internal vacuum pressure does not reach an unacceptably high level.

Referring still to U.S. Pat. No. 8,673,156, and characterizing the described invention as a method, the method comprises the steps of: (a) transporting a suspension into a first chamber, the first chamber including a filter restricting access to a drain; (b) sealing the first chamber with a lid, the lid including a pliable membrane contacting the suspension; and (c) applying a vacuum to the first chamber via the drain, whereby the vacuum applies negative pressure to the suspension, such that the negative pressure forces liquid components of the suspension through the filter, and the vacuum applies negative pressure to the pliable membrane, such that the pliable membrane exerts positive pressure against the suspension, such that the positive pressure forces liquid components of the suspension through the filter. The method further includes the additional step (d) applying a rigid cap to the pliable membrane on a side opposite the suspension, the rigid cap exerting pressure on the pliable membrane such that the pressure exerted by the pliable membrane against the suspension is increased. Alternatively, the method may include the additional steps of: (d) unsealing the first chamber; (e) transporting the suspension into a second chamber, the second chamber including a filter restricting access to a drain; (f) sealing the second chamber with a lid, the lid including a pliable membrane contacting the suspension; (g) applying a vacuum to the second chamber via the drain, whereby the vacuum applies negative pressure to the suspension, such that the negative pressure forces liquid components of the suspension through the filter and applies negative pressure to the pliable membrane, such that the pliable membrane exerts positive pressure against the suspension, such that the positive pressure forces liquid components of the suspension through the filter; and (h) applying an airflow of heated compressed air to the suspension, whereby at least a portion of the airflow passes through the suspension such that heat from the airflow and decreased pressure from the vacuum transitions liquid components of the suspension into a vapor phase and expansion of the airflow transports the vapor out of the second chamber via the at least one drain.

However, there remains a need for an alternate apparatus that effectively and efficiently removes liquid from a suspension.

SUMMARY OF THE INVENTION

The present invention is an apparatus for removing liquid from a suspension, and, more particularly, an apparatus that uses injected air, vacuum pressure, and heat to facilitate removal of liquid from a suspension.

An exemplary apparatus for removing liquid from a suspension made in accordance with the present invention comprises one or more drying chambers arranged in series. Each such drying chamber defines a substantially enclosed volume in which liquid is extracted from a suspension as it passes through the drying chamber. An exemplary apparatus for removing liquid from a suspension made in accordance with the present invention further comprises an internal conveyor system comprised of a conveyor belt and one or more rollers for driving the conveyor belt and transporting the suspension through the drying chambers at a substantially continuous speed. Such a conveyor belt is preferably manufactured from a material capable of withstanding the heat and pressure created within the drying chambers without significantly stretching, warping, tearing, or being otherwise rendered useless. Furthermore, the conveyor belt is preferably semi-permeable (i.e., perforated or porous), thus allowing liquids and gases to pass through the conveyor belt, while still supporting solids.

A suspension is loaded onto the conveyor belt at a first end of the conveyor belt. In each of the drying chambers, compressed and heated air is injected and applied in conjunction with a vacuum. In other words, air is pushed into and pulled from each of the drying chambers as the conveyor belt carries the suspension through the drying chambers.

With respect to the injection of air into each of the drying chambers, in some embodiments, air exits a blower and is routed via a hose to an air injection trunk line. Multiple air delivery hoses then connect the air injection trunk line to the lid of each of the drying chambers. In each drying chamber, air is then diffused by and distributed through one or more air distribution plates. The air contacts the suspension carried on the conveyor belt, and the air is then pulled through the suspension and the conveyor belt, exiting through a vacuum pipe. As a result of the application of the vacuum, the air further expands from its compressed state, through atmospheric conditions, into a negative pressure, such that the flow rate is significantly increased as the air passes through the suspension. In short, the positive-pressure injection of air into the drying chambers, combined with the vacuum pressure applied to the drying chambers, creates a pressure differential that causes rapid air expansion and increased air flow through the suspension. This facilitates efficient removal of liquid from the suspension, as there is an element of force drawing the liquid from the suspension, along with heat transfer. Thus, as the air passes through the suspension, the air becomes heavily saturated.

The heavily saturated air is then delivered to a condenser. In the condenser, the air reaches full saturation, and the liquid component (such as water) is drawn from the air as it cools and is collected in a water collection box associated with the condenser.

In some embodiments, the cooled air flows from the condenser back through the drying chambers via a series of pipes. The air is passed through the drying chambers in this manner to preheat and increase the temperature of the air. Such a preheating arrangement thus enables the use of heat that was not absorbed by the suspension to aid in the drying process.

The air is then returned to the blower. The blower again compresses and raises the temperature of the air, and the air is then again directed through the air injection trunk line to multiple air delivery hoses, and then directed into the respective drying chambers. Thus, the air is flowing through the apparatus in a closed loop (i.e., a recirculating air stream), such that the blower is also used to create the vacuum that draws air from each drying chamber.

DESCRIPTION OF THE DRAWINGS

FIG. 2 is a top view of the exemplary apparatus of FIG. 1, with the lids of the drying chambers in a closed position, and with certain hoses represented only by dashed lines;

FIG. 3 is a side sectional view of the exemplary apparatus of FIG. 1 taken along line 3-3 of FIG. 2;

DETAILED DESCRIPTION OF THE INVENTION

Figure 1:
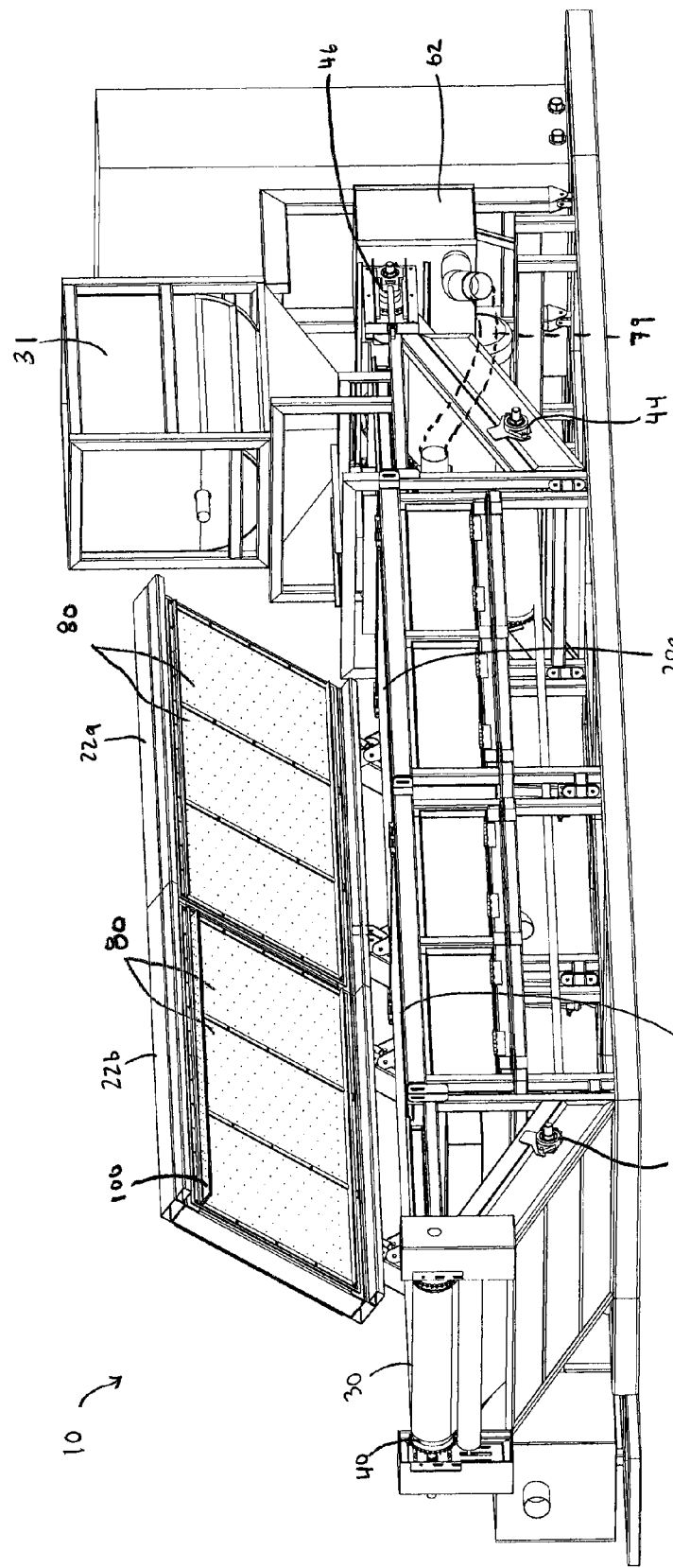
FIG. 1 is a perspective view of an exemplary apparatus made in accordance with the present invention, with the lids of the drying chambers open and in a raised position, and with certain hoses represented only by dashed lines.

The present invention is an apparatus for removing liquid from a suspension, and, more particularly, an apparatus that uses injected air, vacuum pressure, and heat to facilitate removal of liquid from a suspension.

FIGS. 1-6 are various views of an exemplary apparatus 10 for removing liquid from a suspension made in accordance with the present invention. The apparatus 10 comprises one or more drying chambers 20a, 20b arranged in series. Each such drying chamber 20a, 20b defines a substantially enclosed volume in which liquid is extracted from a suspension as it passes through the drying chamber 20a, 20b, as further described below. Although two such drying chambers 20a, 20b are shown and described in this exemplary embodiment, depending on the specific properties of the suspension and other factors, fewer or more drying chambers could be incorporated into the apparatus without departing from the spirit and scope of the present invention. Furthermore, although the details are not critical to the operation of the apparatus 10, the drying chambers 20a, 20b are mounted to and supported by a suitable framework.

Similar to the apparatus described in U.S. Pat. No. 8,673, 156, the apparatus 10 of the present invention also includes an internal conveyor system comprised of a conveyor belt 30 and one or more rollers 40, 42, 44, 46 (FIG. 3) for driving the conveyor belt and transporting the suspension through the drying chambers 20a, 20b. However, unlike the apparatus described in U.S. Pat. No. 8,673,156, the conveyor belt 30 moves continuously (for example, at a speed of approximately 1.5 feet per minute) through the drying chambers 20a, 20b. There is no stop or pause as material moves through the drying chambers 20a, 20b. In any event, such a conveyor belt 30 is preferably manufactured from a material capable of withstanding the heat and pressure created within the drying chambers 20a, 20b without significantly stretching, warping, tearing, or being otherwise rendered useless. Furthermore, the conveyor belt 30 is preferably semi-permeable (i.e., perforated or porous), thus allowing liquids and gases to pass through the conveyor belt 30, while still supporting solids. Preferred materials for the conveyor belt 30 include a stainless steel mesh, a high-temperature polyphenylene sulfide (PPS) mesh, or a porous Kevlar® mesh. (Kevlar® is a registered trademark of E. I. Du Pont de Nemours and Company Corporation of Wilmington, Del.) Of course, an important consideration in constructing the conveyor belt 30 for use with the apparatus is the size of the solid particulate matter in the suspension. For example, finer solid particulate matter would require a finer mesh in order to prevent the solid particulate matter from passing through the conveyor belt 30 with the liquids and gases.

A suspension is loaded onto the conveyor belt 30 at a first end of the conveyor belt 30. In the exemplary embodiment illustrated in FIGS. 1-6, the apparatus 10 includes a material sifter 31, which is positioned at the first end of the conveyor belt 30 and meters the suspension onto the conveyor belt 30. In addition, the material sifter 31 acts to break the suspension into small particles (e.g., 2 to 4 millimeters in diameter) to increase the exposed surface area of the suspension being dried and to increase the porosity of the suspension to enable better air flow through the suspension. However, various means of loading the suspension onto the conveyor belt 30 may be incorporated into the apparatus 10 without departing from the spirit and scope of the present invention.

In each of the drying chambers 20a, 20b, compressed and heated air is injected and applied in conjunction with a vacuum. In other words, air is pushed into and pulled from each of the drying chambers 20a, 20b. In this exemplary embodiment, air is injected via an air injection trunk line 60 into each of the drying chambers 20a, 20b. A vacuum pipe 70 then runs along the length of the drying chambers 20a, 20b, with one or more vacuum pipe segments 71 extending from the vacuum pipe 70 into the bottom of each of the drying chambers 20a, 20b, drawing air from the respective drying chambers 20a, 20b.

With respect to the injection of air into each of the drying chambers 20a, 20b, in this exemplary embodiment and as best shown in FIG. 2, air exits a blower 66 (as further described below) and is routed via a hose 68 (which is represented by dashed lines) to the air injection trunk line 60. Multiple air delivery hoses 61 (which are also represented by dashed lines) then connect the air injection trunk line 60 to the lid 22a, 22b of each of the drying chambers 20a, 20b. In this exemplary embodiment, there are three air delivery hoses 61 associated with each drying chamber 20a, 20b, but fewer or more delivery hoses could be employed without departing from the spirit and scope of the present invention. Furthermore, as shown, the diameter of the air injection trunk line 60 decreases as it moves away from the blower 66 to account for pressure losses and ensure a relatively consistent volume of air is delivered through each air delivery hose 61 to the respective drying chambers 20a, 20b.

Figure 4:
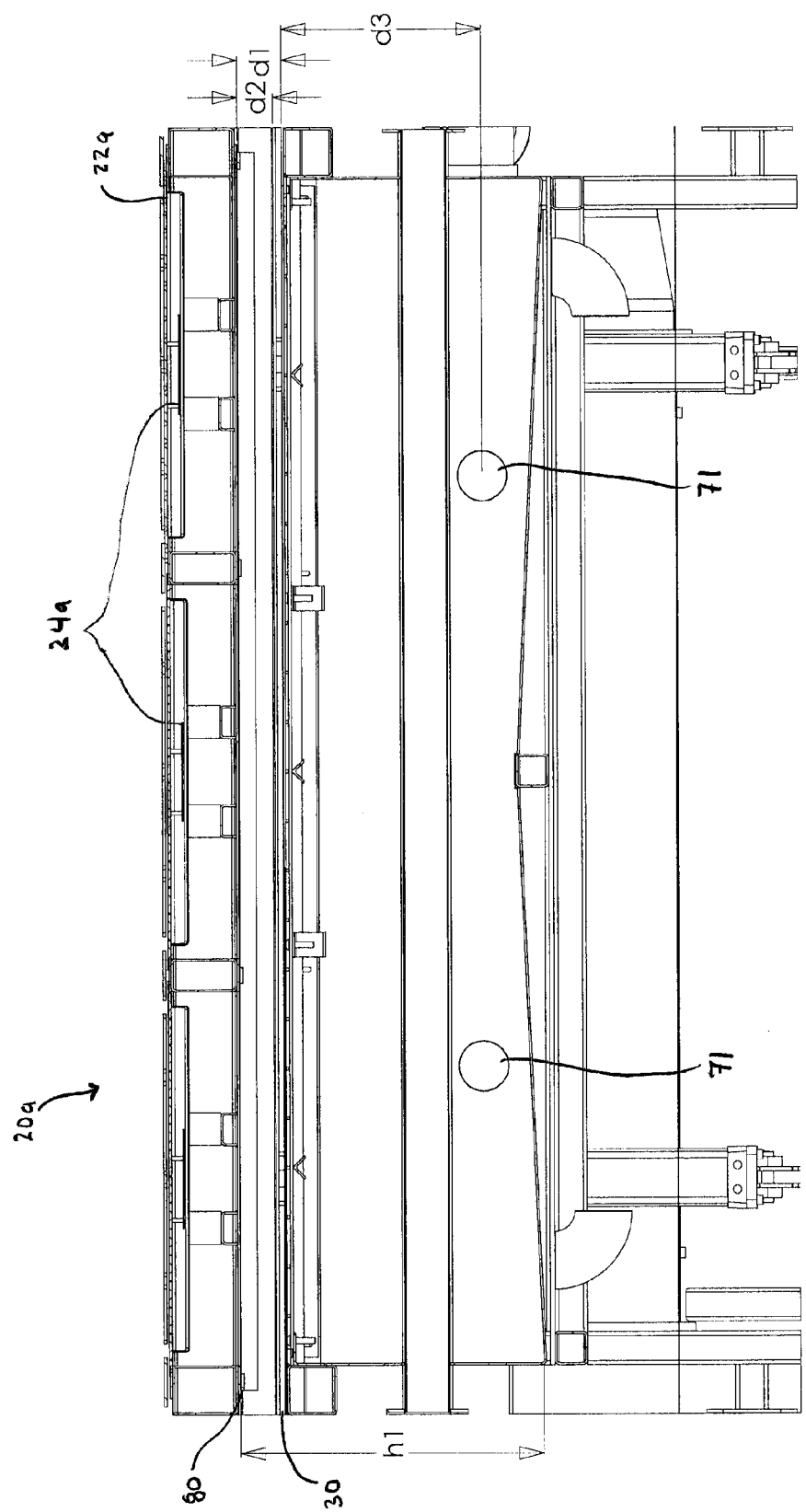
FIG. 4 is an enlarged, partial side sectional view of one of the drying chambers of the exemplary apparatus of FIG. 1.
Figure 6:
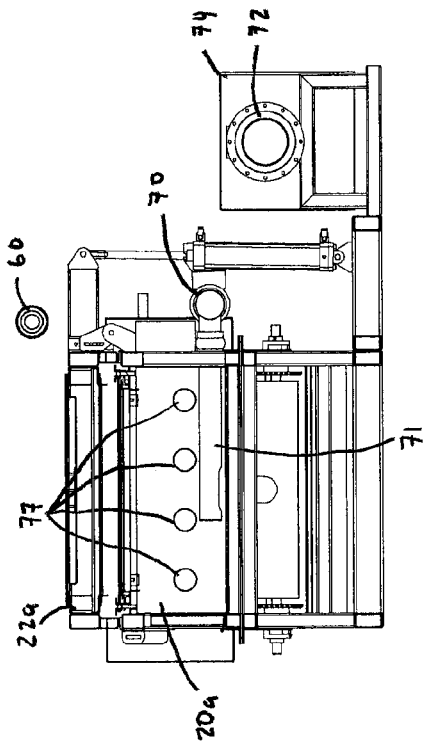
FIG. 6 is a sectional view of the exemplary apparatus of FIG. 1 taken along line 6-6 of FIG. 5.
Figure 5:
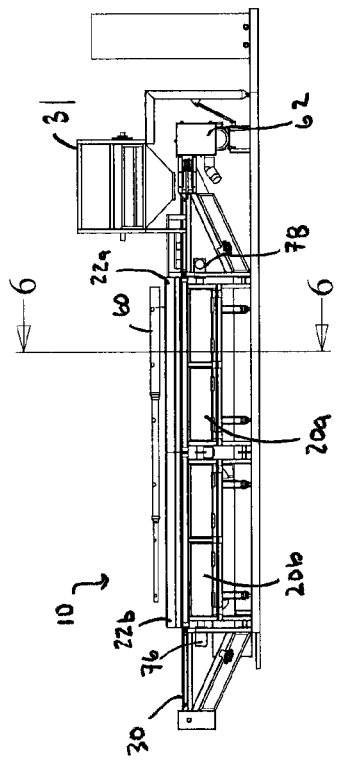
FIG. 5 is a side view of the exemplary apparatus of FIG. 1.

Referring now to the enlarged, partial side sectional view of FIG. 4, in the drying chamber 20a, air is thus injected from the air injection trunk line 60 (see FIG. 2) via the air delivery hoses 61 (FIG. 2) and then diffused and distributed through one or more air distribution plates 80 (as further described below). The air contacts the suspension carried on the conveyor belt 30, and the air is then pulled through the suspension and the conveyor belt 30, exiting through the vacuum pipe segments 71 into the vacuum pipe 70. As shown in FIG. 4, in this exemplary embodiment, the distance between the air distribution plate 80 and the conveyor belt 30, $d_1$, is approximately 2.0 inches. Assuming there is approximately 0.50 inches of suspension on the conveyor belt 30, the distance between the air distribution plate 80 and the suspension, $d_2$, is approximately 1.50 inches. Furthermore, in this exemplary embodiment, the distance between the conveyor belt 30 and the vacuum pipe segments 71, $d_3$, is approximately 12.0 inches, and the overall height of the drying chamber 20a, from the floor to the air distribution plate 80, $h_1$, is approximately 18.0 inches.

Figure 7:
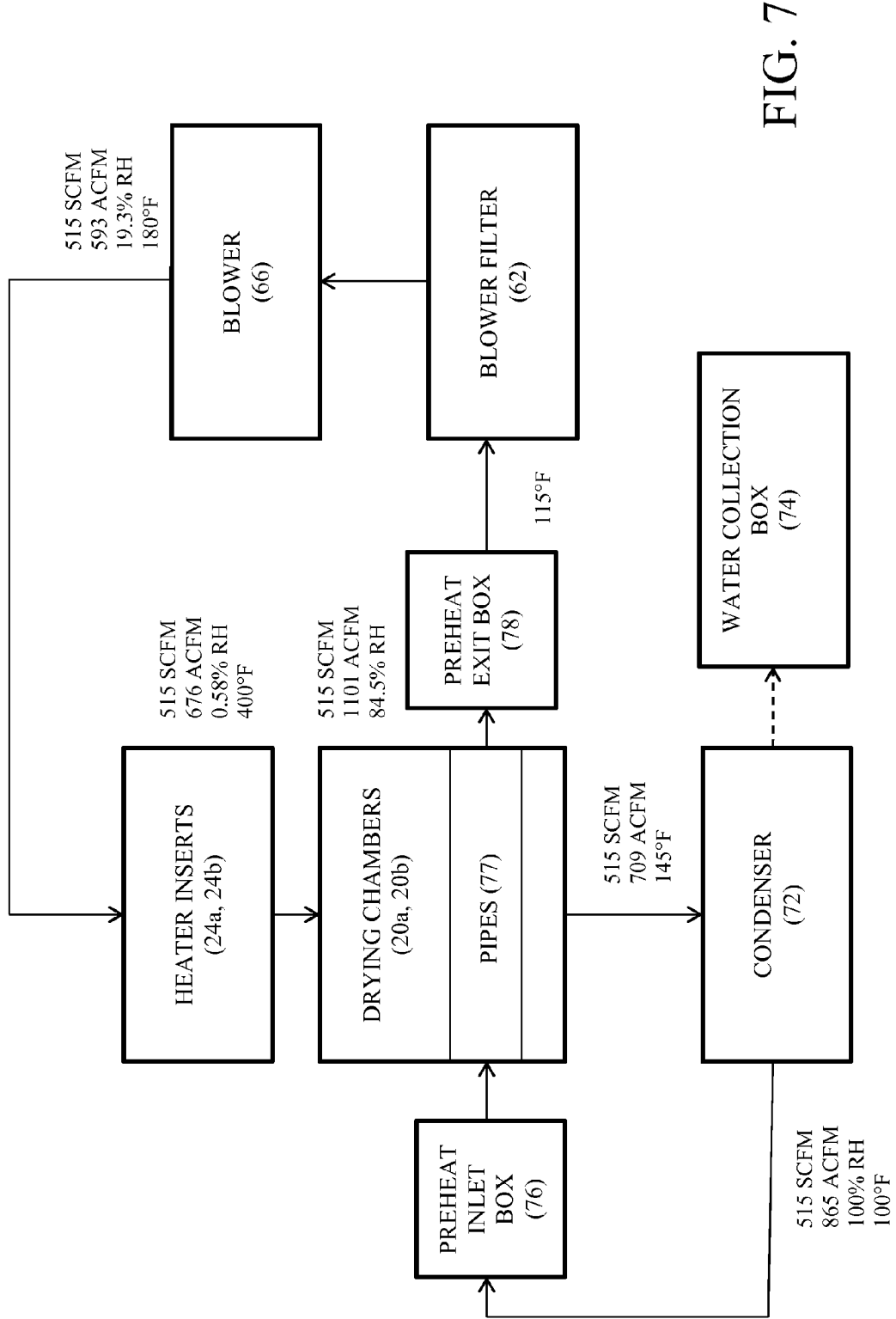
FIG. 7 is a schematic diagram of the air flow through the exemplary apparatus of FIG. 1.

FIG. 7 is a schematic diagram of the air flow through the exemplary apparatus 10. As shown, the blower 66 generates a positive pressure, which injects air into the respective drying chambers 20a, 20b. The positive pressure generated by the blower 66 acts to increase the temperature of the air, and it also acts to compress and decrease the volume of air that will be subsequently heated. In this regard, similar to the apparatus described in U.S. Pat. No. 8,673,156 and as described above, the air is directed from the blower 66 through the air injection trunk line 60 to multiple air delivery hoses 61 that, in turn, direct air into the respective drying chambers 20a, 20b. With respect to the drying chambers 20a, 20b, and again similar to the apparatus described in U.S. Pat. No. 8,673,156, the lid 22a, 22b of each drying chamber 20a, 20b is provided with one or more heating elements 24a, 24b that raise the temperature of the air (for example, to approximately 400° F.) as it enters the respective drying chamber 20a, 20b. In this regard, various forms of heating elements could be used, including heating coils, heat exchangers, or gas burners, to raise the temperature of the air. To the extent that a heat exchanger is used, waste heat (such as a flue gas) can be used, at least in part, as the source of thermal energy. Furthermore, although the heating elements 24a, 24b are incorporated into the lids 22a, 22b in this exemplary embodiment, the heating elements 24a, 24b could also be external to the drying chambers 20a, 20b without departing from the spirit and scope of the present invention.

Figure 8:
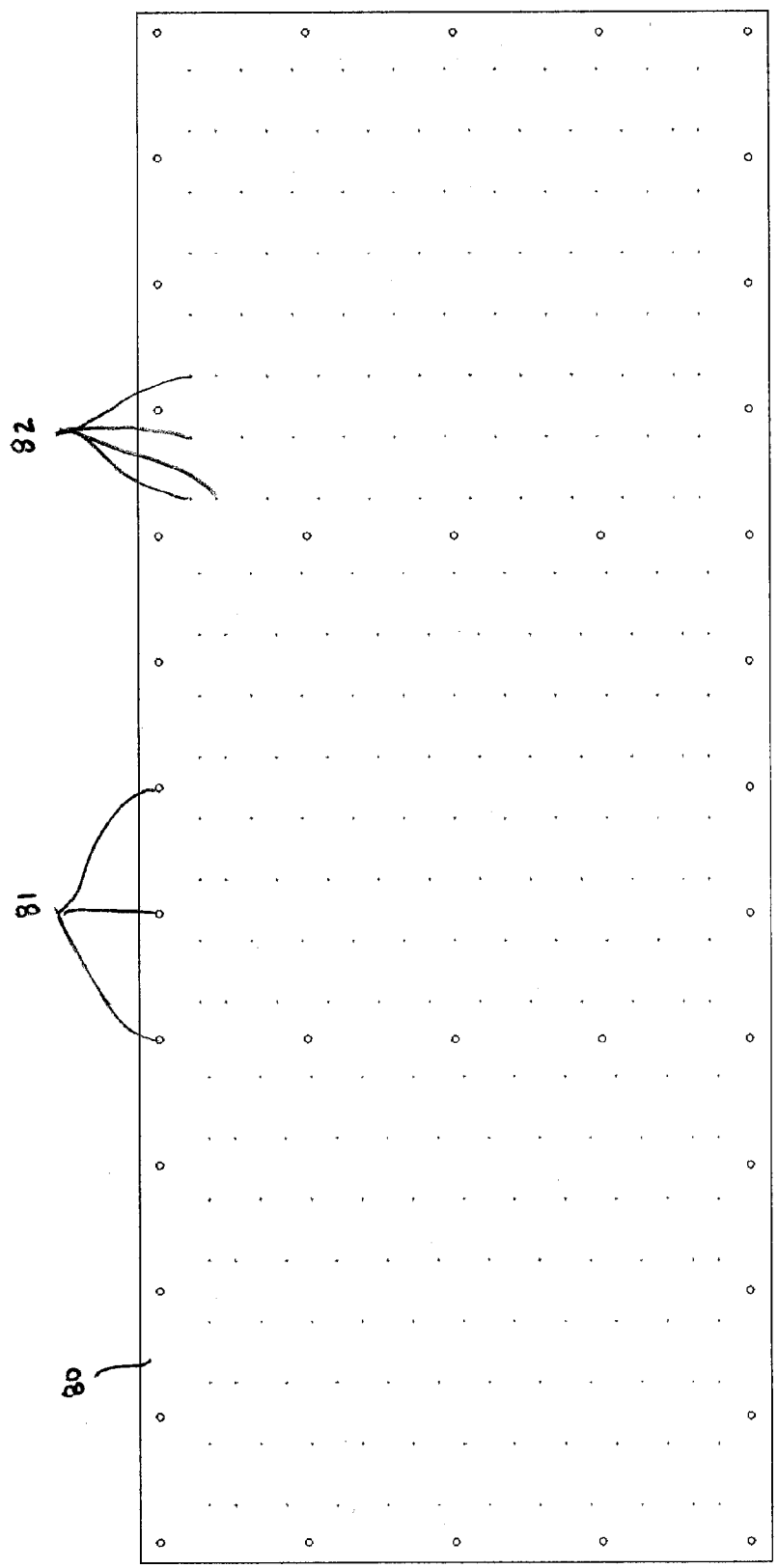
FIG. 8 is a plan view of an air distribution plate for use in each drying chamber in an exemplary apparatus made in accordance with the present invention.

As a further refinement, the lid 22a, 22b of each drying chamber 20a, 20b is also provided with one or more air distribution plates 80. As shown in FIG. 8, each air distribution plate 80 includes a staggered hole pattern that directs the heated air to the suspension, as further described below. Thus, in practice, as the air is injected into each of the drying chambers 20a, 20b, the air is diffused by and distributed through the one more air distribution plates 80 within the lids 22a, 22b of the respective drying chambers 20a, 20b.

Referring still to FIG. 7, in one preferred implementation, the blower 66 is operating at approximately 515 standard cubic feet per minute (SCFM). However, as a result of the temperature and pressure conditions, the actual flow rate is approximately 593 actual cubic feet per minute (ACFM) at approximately 5 psi. The pressurized air also results in a higher temperature (for example, 180° F.), with a relative humidity of approximately 19.3%, as the air exits the blower 66 and is delivered to the lids 22a, 22b of the of the drying chambers 20a, 20b. As described above, the one or more heating elements 24a, 24b in each lid 22a, 22b then raise the temperature (for example, to approximately 400° F.). As a result, the air expands and is dried, such that the actual flow rate is increased to approximately 676 ACFM, while the relative humidity is reduced to approximately 0.58%.

Referring still to FIG. 7, as mentioned above, air is also pulled through the suspension and out of each drying chamber 20a, 20b, through one or more vacuum pipe segments 71 positioned below the conveyor belt 30, and into the vacuum pipe 70. In one preferred implementation, a vacuum pressure of approximately 30 inches of water (8 kPa) is created within each drying chamber 20a, 20b. In this regard, and as will become clearer in the discussion that follows, the air is flowing through the apparatus 10 in a closed loop (i.e., a recirculating air stream), such that the blower 66 is also used to create the vacuum that draws air from each drying chamber 20a, 20b. Thus, the vacuum pipe 70 is operably connected to the intake of the blower 66.

As a result of the application of the vacuum, the air further expands from its compressed state, through atmospheric conditions, into a negative pressure, such that the actual flow rate is approximately 1101 ACFM as the air passes through the suspension. Such transition of the expanding air occurs in the short distance between the air distribution plate 80 and the conveyor belt 30, as described above with reference to FIG. 4. In short, the positive-pressure injection of air into the drying chambers 20a, 20b, combined with the vacuum pressure applied to the drying chambers 20a, 20b, creates a pressure differential that causes rapid air expansion and acceleration of the air as it passes through the suspension. The expansion and acceleration of the air as it passes through the suspension enables moisture to be removed from the suspension by mass transfer. By heating the air in a dense state (lower volume), the ideal heat transfer by the heating elements 24a, 24b is also conducted in an efficient manner. Thus, both mass transfer and heat transfer are utilized in an efficient form to remove liquid from the suspension. Accordingly, as the air passes through the suspension, the air becomes heavily saturated, and the relative humidity increases to approximately 84.5% (or higher).

Referring still to FIG. 7, the heavily saturated air is then evacuated from the respective drying chambers 20a, 20b and delivered via a hose 73 (which is represented by dashed lines in FIG. 2) to a condenser 72. As the air leaves the drying chambers 20a, 20b, it has cooled, such that, in one preferred implementation, the actual flow rate is reduced to 709 ACFM, and the temperature of the air is approximately 145° F. as it enters the condenser 72. As a further refinement, one or more filters (not shown) may be interposed between the drying chambers 20a, 20b and the condenser 72 to reduce or eliminate debris or solid particles that may be in the air stream from entering the condenser 72. The condenser 72 is designed to have a larger total volume (i.e., larger total diameter), such that the saturated air reduces its speed while in contact with the chilled surfaces of the condenser 72. Thus, in the condenser 72, the air reaches full saturation (100% relative humidity), and the liquid component (such as water) is drawn from the air as it cools and is collected in a water collection box 74 associated with the condenser 72. The liquid component can be subsequently drained from the water collection box 74 via a pump or under the force of gravity. Cooled air then exits the condenser with 100% relative humidity, but at a lower temperature (for example, 100° F.) under the vacuum pressure.

Referring still to FIG. 7, the cooled air flows from the condenser 72, through a hose 75 (which is represented by dashed lines in FIG. 2), and then back through the drying chambers 20a, 20b via a series of pipes 77 beginning at a preheat inlet box 76 and ending at a preheat exit box 78. The air is passed through the drying chambers 20a, 20b in this manner to preheat and increase the temperature of the air. Such a preheating arrangement thus enables the use of heat that was not absorbed by the suspension to aid in the drying process. In one preferred implementation, as the air exits the preheat exit box 78 after completing its travel through the drying chambers 20a, 20b, it has reached a temperature of approximately 115° F.

Referring still to FIG. 7, after exiting through the preheat exit box 78, the air flows through a return hose 79 (which is represented by dashed lines in FIGS. 1 and 2) to a blower filter box 62 that provides filtration of the air prior to returning it to the blower 66. The blower filter box 62 prevents any foreign materials, grease, or particulates from reaching the blower 66 where it could cause maintenance problems or damage. In one preferred implementation, as the air exits the blower filter box 62 and enters the blower 66, the actual flow rate is approximately 802 ACFM, and the relative humidity is approximately 64.0%. Of course, the blower 66 again compresses and raises the temperature of the air, so that, in one preferred implementation, it again exits the blower 66 with an actual volumetric flow rate of approximately 593 ACFM at a temperature of approximately 180° F. and a relative humidity of approximately 19.3%. The air is then again directed through the air injection trunk line 60, through the multiple air delivery hoses 61, heated by the heating elements 24a, 24b, and then injected into the respective drying chambers 20a, 20b.

Again, as described above, the air is flowing through the apparatus 10 in a closed loop (i.e., a recirculating air stream), such that the blower 66 is also used to create the vacuum that draws air from each drying chamber 20a, 20b. As a result, no exhausting of the air stream is necessary, which often requires some form of costly permitting. Furthermore, as described above, thermal energy is not wasted as the preheating arrangement enables the use of heat that was not absorbed by the suspension to aid in the drying process.

As mentioned above, FIG. 8 is a plan view of an exemplary air distribution plate 80 that includes a staggered hole pattern that directs the heated air to the suspension. In this regard, the larger holes 81 are used to receive fasteners and mount the air distribution plate 80 to a respective lid 22a, 22b of a particular drying chamber 20a, 20b. The smaller holes 82 are the holes through which air passes and is distributed into a respective drying chamber 20a, 20b. The number and size of the holes 82 represent the "bottle-neck" of the closed loop flow of air, such that pressure in the closed loop builds directly above the suspension being dried. Furthermore, the use of a staggered or alternating pattern of holes 82 in the air distribution plate 80 effectively causes the heated air to mix the suspension as it is directed onto and passes through the suspension. In this regard, a jet of air directed through one hole of the air distribution plate 80 can cause a divot or "valley" in the suspension. However, as the suspension continues to travel on the conveyor belt 30 through one of the drying chambers 20a, 20b, the next jet of air strikes the "peak" of suspension material adjacent the "valley," thus mixing and evening out the suspension material.

Of course, air distribution plates with fewer or more holes, or with holes in differing patterns, could be employed to alter flow rates or pressure conditions without departing from the spirit and scope of the present invention. Air distribution plates may also be interchanged to enable larger (or smaller) volumes of air to be utilized in the drying process. This practice allows for increased or decreased production rates without any other significant alterations or modifications to the apparatus. Furthermore, in some embodiments, the air distribution plates may be coated with a ceramic Teflon® or similar coating to prevent the suspension, or contaminates (e.g., plastics) in the suspension, from sticking to the air distribution plates. (Teflon® is a registered trademark of E. I. Du Pont de Nemours and Company Corporation of Wilmington, Del.)

Although not shown in the Figures, it is, of course, contemplated that an apparatus for removing liquid from a suspension made in accordance with the present invention would include a control system. For example, with respect to the exemplary apparatus 10 described above, such a control system could include a microprocessor with a memory component. A motor associated with the conveyor belt 30 would be operably connected to and receive control signals from the microprocessor. Similarly, the blower 66 would be operably connected to and receive control signals from the microprocessor. The heating elements 24a, 24b, the material sifter 31, and the condenser 72 also would be operably connected to and receive control signals from the microprocessor. Accordingly, each of these components could be operated in response to user input. Furthermore, preprogrammed routines could be stored in the memory component to automate the process. For example, the user may simply have to press a button to activate a preprogrammed routine that operates the components to initiate and carry out a drying process for a particular suspension.

It is also contemplated that one or more sensors, such as pressure sensors and/or thermocouples, could be operably connected to the microprocessor to monitor the operation of the apparatus 10. Feedback from such sensors could then be used to monitor and control the temperature and volume of the air passing at various stages in the drying process. For example, with respect to the exemplary embodiment illustrated in FIGS. 1-6, the temperature of the air stream may be monitored and controlled along the entire length of the apparatus, i.e., the temperature may be controlled to +/−5° F. every two feet of a 12-foot long apparatus, thus providing six controlled stages of drying.

Figure 9:
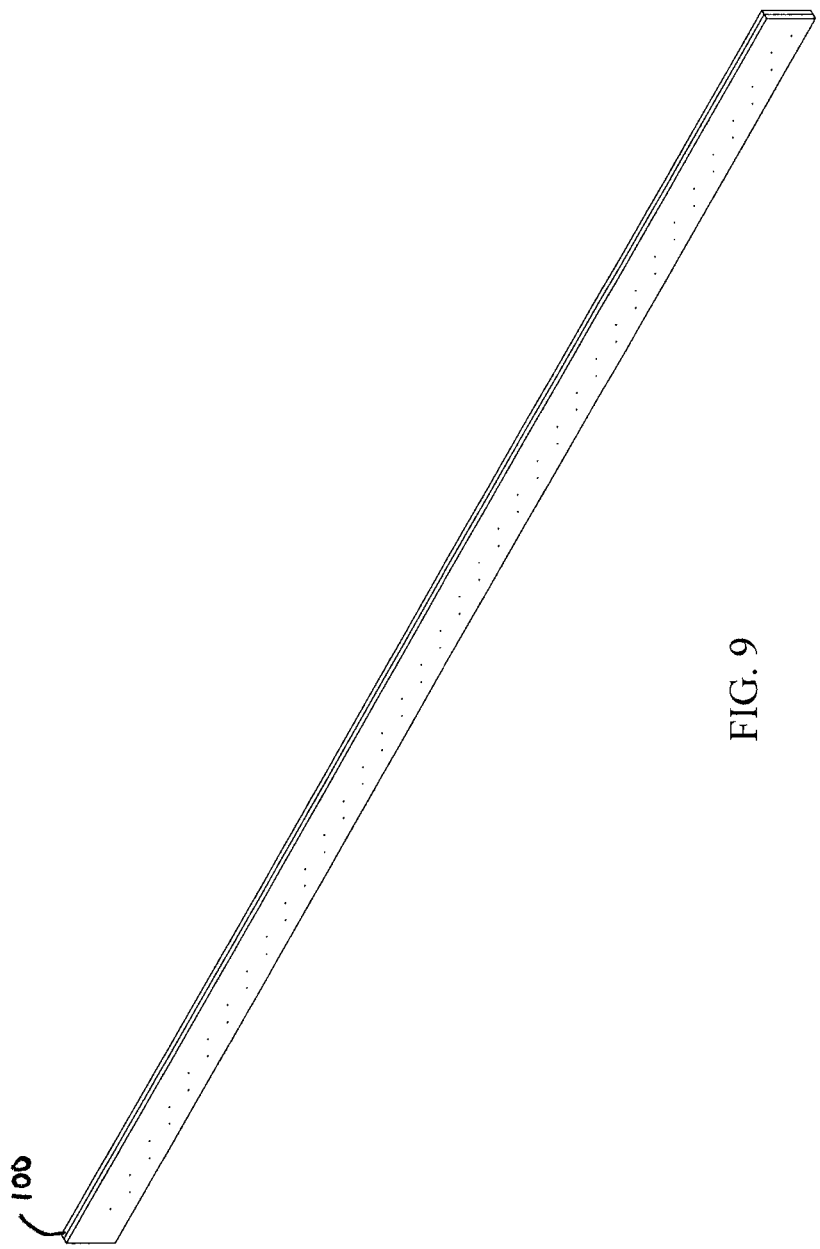
FIG. 9 is a perspective view of a fire suppression skirt for use in an exemplary apparatus made in accordance with the present invention.
Figure 10:
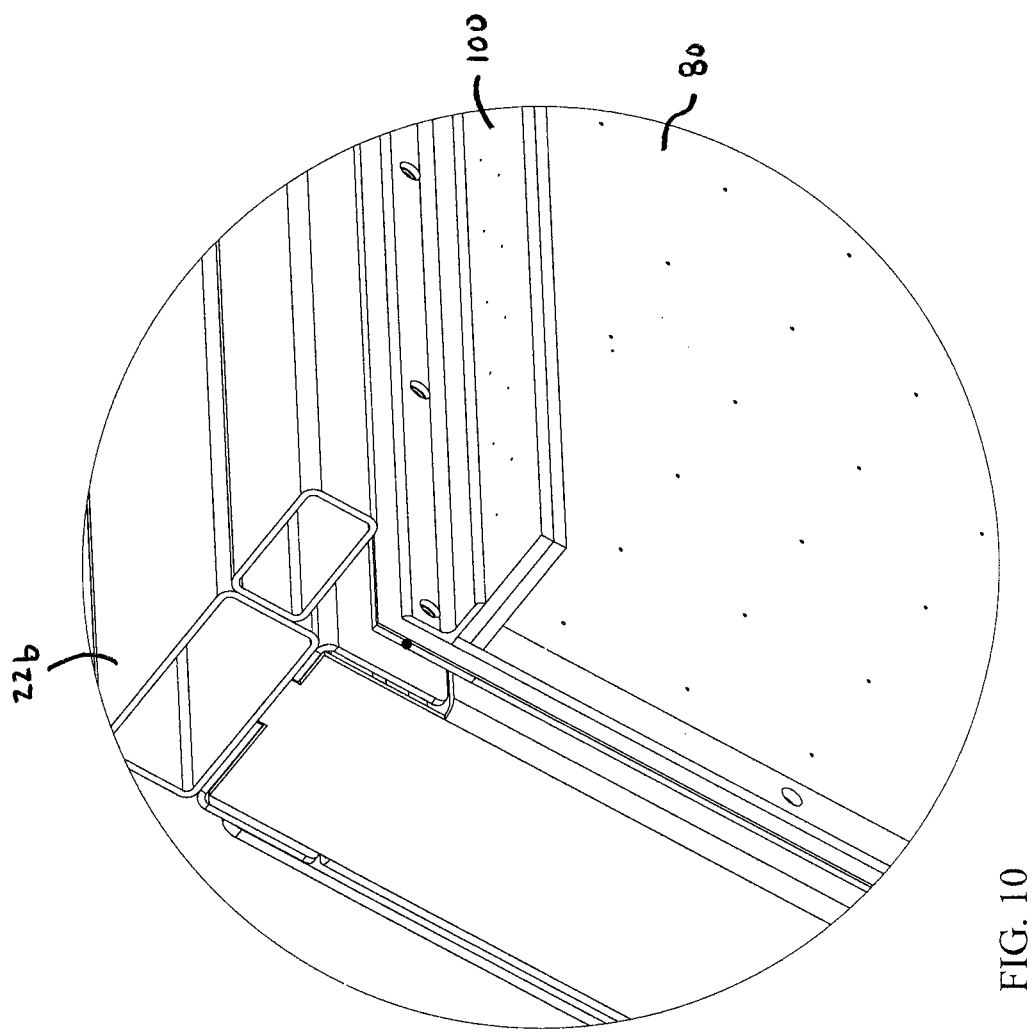
FIG. 10 is an enlarged view of the fire suppression skirt of FIG. 9 as installed in an exemplary apparatus made in accordance with the present invention.

Referring now to FIGS. 1, 9, and 10, as a further refinement, in some embodiments, an exemplary apparatus for removing liquid from a suspension made in accordance with the present invention includes fire suppression skirts 100. As best shown in FIG. 10, such a fire suppression skirt 100 extends downwardly from the air distribution plate 80 and preferably runs along the opposite longitudinal edges of the lid 22b. Thus, when the lid 22b is closed, a fire suppression skirt 100 is positioned on either side of the conveyor belt 30 in the drying chamber 20b, thus keeping the suspension materials on the conveyor belt 30, and further preventing air from passing over and around the suspension instead of through the suspension.

Figure 11:
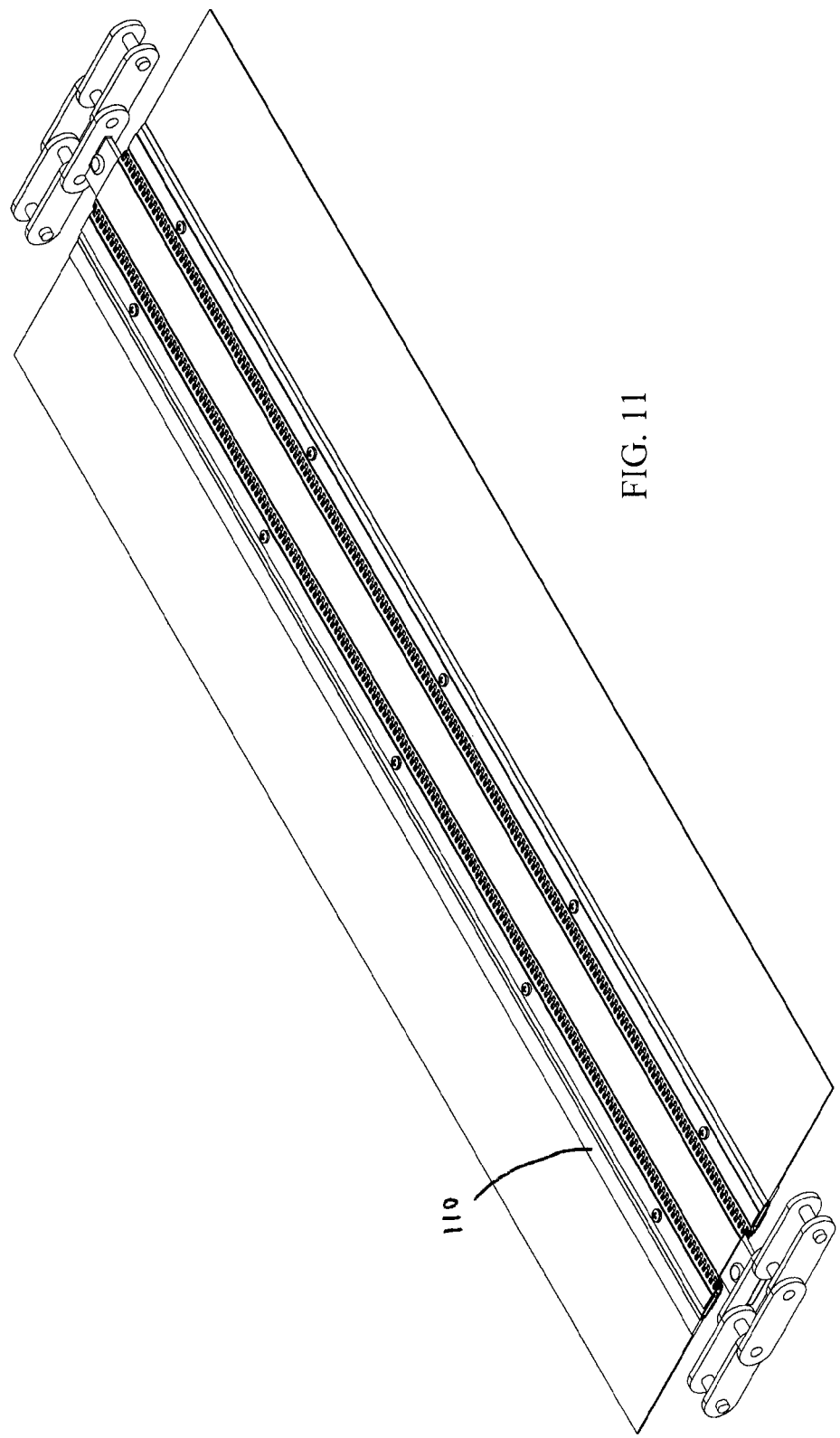
FIG. 11 is a perspective view of a belt connector for use in an exemplary apparatus made in accordance with the present invention.
Figure 12:
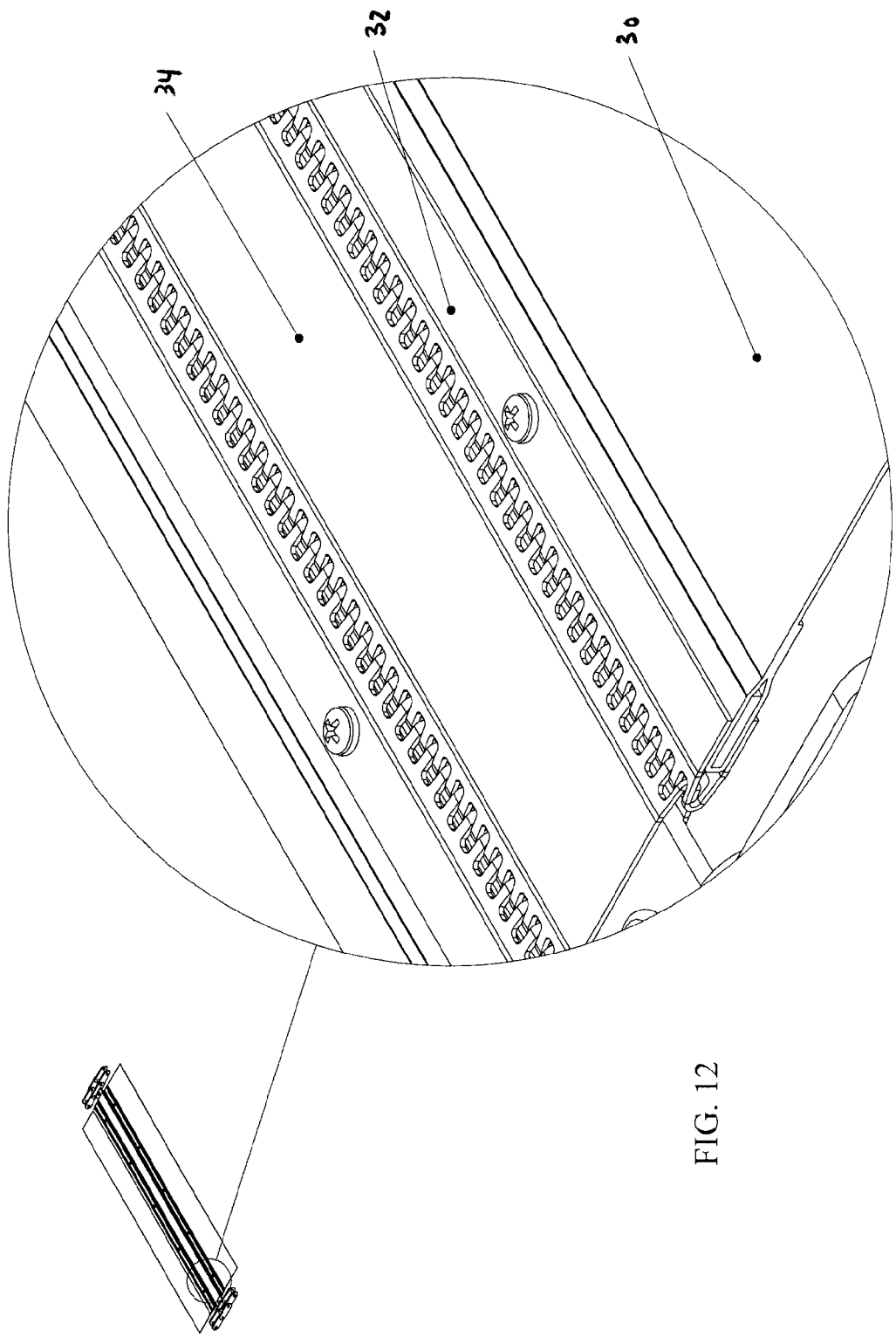
FIG. 12 is an enlarged view of the belt connector of FIG. 11.

Referring now to FIGS. 11 and 12, as a further refinement, in some embodiments, an exemplary apparatus for removing liquid from a suspension made in accordance with the present invention includes a particular arrangement for connecting respective ends of the conveyor belt 30 to create a continuous loop. Specifically, a belt splice element 32 is secured to each edge of two adjacent sections of the conveyor belt 30. Each belt splice element 32 is formed from a flat sheet of metal. Small holes are cut in a row along the centerline of the sheet of metal. Once the holes are made, the metal is bent in half with a rounded bend, and thus, loops are formed along one edge of each belt splice element 32. Furthermore, as a result of the bending of the sheet of metal, there is an open opposite edge of each belt splice element 32 that can accommodate an edge of a section of the conveyor belt 30, where it is secured by rivets, screws, or similar fasteners. To complete the assembly, a belt drive bar 34 is then provided with corresponding hook portions that engage the loops formed along the edge of each belt splice element 32. Of course, and as also shown in FIG. 12, the belt drive bar 34 is connected to a chain drive for driving the conveyor belt 30. Such an arrangement allows the conveyor belt 30 to be constructed in multiple sections that are readily replaceable if damaged. Such an arrangement also provides sustainable movement over the rollers and decreases deflection of the belt drive bar when belt loading occurs.

As a further refinement, and as an option for additional stability, in some embodiments, the conveyor belt 30 may be wrapped around an additional flat bar and then inserted into the open edge of a belt splice element 32, which provides additional strength to the connection.

In some embodiments, conveyor belts may be comprised of a single (or multiple) conveyor belts connected with lacing, such as Alligator® lacing, from end to end. (Alligator® is a registered trademark of Flexible Steel Lacing Company of Downers Grove, Ill.)

In some embodiments, one or more of the drive rollers used to drive the conveyor belt may be coated to increase the friction between the drive rollers and the conveyor belt.

One of ordinary skill in the art will also recognize that additional embodiments and configurations are also possible without departing from the teachings of the present invention or the scope of the claims which follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. An apparatus for removing liquid from a suspension, comprising:
   one or more drying chambers;
   a conveyor system transporting the suspension through the one or more drying chambers at a substantially continuous speed, including a semi-permeable conveyor belt;
   a blower injecting compressed air into the one or more drying chambers;
   a vacuum means drawing saturated air out of each of the one or more drying chambers, thus creating a pressure differential that causes rapid expansion and acceleration of the air as it passes through the suspension in the one or more drying chambers; and
   a condenser receiving the saturated air from the vacuum means, cooling the saturated air, and collecting liquid from the saturated air.

2. The apparatus for removing liquid from a suspension as recited in claim 1, in which the compressed air is directed from the blower through an air injection trunk line and into each of the one or more drying chambers via one or more air delivery hoses.

3. The apparatus for removing liquid from a suspension as recited in claim 2, in which the compressed air is directed into each of the one or more drying chambers through a respective lid of each of the one or more drying chambers.

4. The apparatus for removing liquid from a suspension as recited in claim 1, wherein one or more heating elements are interposed between the blower and the one or more drying chambers to raise the temperature of the compressed air as it enters the respective drying chambers.

5. The apparatus for removing liquid from a suspension as recited in claim 3, wherein one or more heating elements are incorporated into the respective lid of each of the one or more drying chambers to raise a temperature of the compressed air as it enters the respective drying chambers.

6. The apparatus for removing liquid from a suspension as recited in claim 3, and further comprising an air distribution plate in each of the one or more drying chambers controlling a flow of the compressed air into the one or more drying chambers.

7. The apparatus for removing liquid from a suspension as recited in claim 1, wherein the vacuum means comprises a vacuum pipe that runs along the length of the one or more drying chambers, along with one or more vacuum pipe segments that extend from the vacuum pipe into the bottom of each of the one or more drying chambers drawing the saturated air out of each of the one or more drying chambers.

8. The apparatus for removing liquid from a suspension as recited in claim 7, wherein the vacuum pipe is operably connected to an intake of the blower.

9. An apparatus for removing liquid from a suspension, comprising:
   one or more drying chambers;
   a conveyor system transporting the suspension through the one or more drying chambers at a substantially continuous speed, including a semi-permeable conveyor belt;
   a blower injecting compressed air into the one or more drying chambers;
   a vacuum pipe that runs along the length of the one or more drying chambers, with one or more vacuum pipe segments that extend from the vacuum pipe into the bottom of each of the one or more drying chambers for drawing saturated air out of each of the one or more drying chambers, thus creating a pressure differential that causes rapid expansion and acceleration of the air as it passes through the suspension in the one or more drying chambers, and wherein the vacuum pipe is operably connected to an intake of the blower; and
   a condenser receiving the saturated air from the vacuum pipe, cooling the saturated air, and collecting liquid from the saturated air, before returning cooled air to the blower.

10. The apparatus for removing liquid from a suspension as recited in claim 9, and further comprising a preheating arrangement in which cooled air exiting the condenser is passed through the one or more drying chambers to preheat and increase the temperature of the cooled air before returning it to the blower.

11. The apparatus for removing liquid from a suspension as recited in claim 10, wherein the preheating arrangement includes a preheat inlet box external to the one or more drying chambers at one end of the apparatus, a preheat exit box external to the one or more drying chambers at an opposite end of the apparatus, and one or pipes that extend between the preheat inlet box and the preheat exit box and carry the air through the one or more drying chambers to preheat and increase the temperature of the cooled air.

12. An apparatus for removing liquid from a suspension, comprising:
   one or more drying chambers;
   a conveyor system transporting the suspension through the one or more drying chambers at a substantially continuous speed, including a semi-permeable conveyor belt; and an air system (a) injecting heated and compressed air into each of the one or more drying chambers, and (b) drawing saturated air through the suspension and out of each of the one or more drying chambers, wherein the air system includes an air distribution plate in each of the one or more drying chambers, with multiple holes defined through the air distribution plate in a predetermined pattern to control a flow of the heated and compressed air into the one or more drying chambers.

13. The apparatus for removing liquid from a suspension as recited in claim 12, in which the air distribution plate is positioned approximately 2.0 inches above an upper surface of the semi-permeable conveyor belt.

14. The apparatus for removing liquid from a suspension as recited in claim 13, in which the air system includes a vacuum pipe that runs along the length of the one or more drying chambers, along with one or more vacuum pipe segments that extend from the vacuum pipe into the bottom of each of the one or more drying chambers drawing the saturated air out of each of the one or more drying chambers, and wherein the one or more vacuum pipe segments are positioned approximately 12.0 inches below the upper surface of the semi-permeable conveyor belt.

15. The apparatus for removing liquid from a suspension as recited in claim 12, wherein the air system includes a blower which directs the heated and compressed air through an air injection trunk line and into each of the one or more drying chambers via one or more air delivery hoses.

16. The apparatus for removing liquid from a suspension as recited in claim 15, wherein the air system further comprises a condenser receiving the saturated air that is drawn from each of the one or more drying chambers, cooling the saturated air, and collecting liquid from the saturated air, before returning cooled air to the blower.

17. The apparatus for removing liquid from a suspension as recited in claim 16, wherein the air system further comprises a series of pipes for delivering cooled air exiting the condenser through the one or more drying chambers to preheat and increase the temperature of the cooled air before returning it to the blower.

\* \* \* \* \*

UNITED STATES PATENT AND TRADEMARK OFFICE
CERTIFICATE OF CORRECTION

| | | |
|---|---|---|
| PATENT NO. | : 9,341,410 B1 | Page 1 of 1 |
| APPLICATION NO. | : 14/250627 | |
| DATED | : May 17, 2016 | |
| INVENTOR(S) | : William Tid Smith Griffin and Joshua Michael-James DeArmond | |

It is certified that error appears in the above-identified patent and that said Letters Patent is hereby corrected as shown below:

In the Claims,

Claim 9, col. 12, line 35, delete "for" between "chambers" and "drawing"

Signed and Sealed this
Ninth Day of August, 2016

Michelle K. Lee
*Director of the United States Patent and Trademark Office*